Patented Mar. 6, 1945

2,370,662

UNITED STATES PATENT OFFICE 2,370,662

METHOD OF PRODUCING BIOTIN INACTIVATING MATERIAL

Roy Hertz and William H. Sebrell, Bethesda, Md., assignors to the Government of The United States, as represented by the Administrator of the Federal Security Agency No Drawing. Application April 22, 1943, Serial No. 484,082

3 Claims. (Cl. 195—101)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to a biotin inactivating or anti-biotin material and its method of production.

Biotin is now recognized as a vitamin. Biotin is also recognized as being required by man, yeast, and certain bacteria for growth. Biotin is considered essential for the vital functions of many organisms, no form of bacteria having so far been found that does not require it. It is also known that the growth providing property of biotin may be counteracted by avidin which is a potent biotin inactivating agent. Avidin, since it antagonizes biotin, may be used, for example, as a growth control medium for yeast. In the industrial art relating to the fermentation of yeast, avidin has been and is now used to counteract completely the action of the biotin of yeast and thereby stop the yeast growth at the desired time.

Heretofore, the source of avidin has been exclusively the egg white of the domestic hen egg. Avidin has been recognized as the potent antibacterial agent which is the biological factor responsible for egg white injury. A recognized authoritative statement regarding the knowledge concerning the preparation and sources of avidin prior to the present invention is available in the review by Doctor Paul Gyorgy of Western Reserve University, Cleveland, Ohio, in the Annual Review of Biochemistry, volume XI, pp. 334-337, inclusive, published by Annual Reviews, Inc., Stanford University, P. O., California, 1942. On page 337, line 8, this statement is made by Doctor Gyorgy: "The only source of avidin so far known is egg white."

While egg white may possibly be considered as available in relatively large quantities, the use of avidin as an anti-biotin agent has heretofore been limited for a number of reasons. The demand for hen eggs, the previous source of egg white for avidin, as a food is relatively heavy and at least as great as the supply. Large quantities of hen eggs therefore may not be diverted to use as a source of avidin without diminishing, and possibly seriously, the supply of eggs as food for human consumption. Furthermore, the cost of egg white is relatively high, and too high to permit the manufacture and sale of avidin at a sufficiently low cost to enable widespread distribution and use.

It is the discovery of the present invention that the oviducts or oviduct tissue of animals may be used as a source of avidin. The oviduct is the tube or duct of a female animal serving for the passage of the eggs of the animal out of its ovary. These oviducts heretofore have been discarded by slaughter houses in large quantities as waste and without value. An abundant and extremely inexpensive source of avidin, according to the discovery of his invention, is found in the oviducts of hens, which oviducts heretofore have been discarded as waste by poultry slaughter houses. Another inexpensive, but somewhat less abundant, source of avidin, according to the discovery of the present invention, is found in the oviducts of frogs. It is evident that this discovery of utility in animal oviducts and the presence of avidin in a material heretofore regarded as waste will enable low cost production and, consequently, widespread use of avidin.

A statement with respect to the invention described in this specification has been published in the following article: "Occurrence of avidin in the oviduct and secretions of the genital tract of several species," appearing in the journal "Science" published by The Science Press, Lancaster, Pennsylvania, under date of September 11, 1942, volume 96, No. 2489, at page 257.

It is therefore an object of this invention to provide a commercial outlet for material heretofore discarded by animal slaughter houses as waste.

It is another object of this invention to provide a new material as a source of avidin, which material is available in abundance and is relatively inexpensive.

Still another object is to utilize waste of slaughter houses as a source of avidin.

A further object of the invention is to provide avidin which is manufacured from the oviducts of animals.

A still further object is to provide avidin in the form of dried and finely divided oviducts of animals.

A further object of this invention is to provide a novel method for securing avidin.

Other objects and advantages of this invention will be apparent from the following specification and the appended claims.

According to the present invention, the oviducts of animals are used as a source of avidin. Abundant sources of the avidin are the oviducts of both the hen and the wood frog (*R. sylvatica*). The oviduct tissue of Leghorn, Rhode Island Red, New Hampshire and a number of other types of hens have been found to contain avidin. Work in developing this invention shows that animal oviducts, in general, contain avidin and may be used in the present method to secure the product of this invention.

In preparing avidin according to the present invention, animal oviducts, in the fresh state, are spread in the form of a relatively thin layer on plates, or the like. Glass plates are preferred, since the animal oviducts do not readily cling to glass. The oviducts may be readily scraped from these glass plates. Animal oviducts while spread on the plates, or the like, are subjected to a warm, gaseous current and thereby dried. The gas may be air or other suitable medium having no deleterious affect on the oviducts. The gas, although warm, should preferably be at a relatively low temperature. A current of warm air at a temperature of about 37° C. (98.6° F.) has been found to accomplish a satisfactory drying of the animal oviducts.

It is important that the temperature used in the drying step should not appreciably exceed body temperature (37° C. or 98.6° F.). Higher temperatures will impair the anti-biotin property of the avidin in the animal oviducts. Lower temperatures than 37° C., for example, freezing temperature, however, may be used in drying or dehydrating the oviducts according to the present invention. Drying at a temperature of about, but not substantially exceeding, 37° C. is recommended, since such temperature simplifies and expedites the drying step and also permits the use of simplified and relatively inexpensive drying equipment.

This drying of the oviducts inhibits putrification. It is found that the dried oviducts may be stored over relatively long periods without their putrifying. The dried oviducts have the appearance of parchment or sausage skins. For the purpose of facilitating its use and handling, the dried oviduct material is reduced to a finely divided form, as by pulverizing or grinding, in any suitable manner.

The dried, pulverized oviduct material produced in accordance with the above method, may be assayed for avidin by the yeast growth method by Eakin et al. (cf. R. E. Eakin, E. E. Snell, and R. J. Williams, Journal of Biological Chemistry, volume 140, p. 535, 1941).

It has been discovered that the oviduct of the hen, when prepared in accordance with the foregoing method, contains 2.3 units of avidin per gram of dried pulverized tissue. It has been discovered that the oviduct of the wood frog, when prepared in accordance with the foregoing method, contains 0.75 unit of avidin per gram of dried pulverized tissue. A "unit of avidin" is defined as that amount required to completely neutralize the yeast growth supported by one microgram of free crystalline biotin.

Although the dried and pulverized animal oviduct tissue product, which results from the method of this invention, contains a relatively small proportion of avidin, the product is non-theless highly valuable. This value flows from the extremely high potency of avidin. A relatively minute quantity or trace of avidin demonstrates surprising power in nullifying the effect of biotin in sustaining the life of bacteria. That portion of the present product, which is not avidin, is inert. The avidin, therefore, need not be extracted from the product for use. In fact, the large amount of inert material present in the product is an advantage. It is relatively simpler to measure out a quantity of the product to secure a given avidin content than to measure avidin in pure form to secure the corresponding avidin value.

The foregoing is to be understood as illustrative, since this invention includes all embodiments and modifications coming within the scope of the appended claims.

We claim:

1. A method of preparing anti-biotin material, said method comprising the steps of providing animal oviduct tissue in fresh state, drying said tissue while fresh by exposing it to a current of air having a temperature not over about 37° C. to obtain dried tissue having a ratio of 0.75 unit to 2.3 units of active avidin to each gram of inert tissue matter, and finely dividing said dried tissue to secure a product consisting of avidin and inert matter in said ratio.

2. A method of preparing anti-biotin material, said method comprising the steps of spreading hen oviduct tissue in fresh state in a relatively thin layer, drying said tissue by exposing said layer to a current of air having a temperature not over about 37° C. to obtain dried tissue having a ratio of substantially 2.3 units of active avidin to each gram of inert tissue matter, and finely dividing said dried tissue to secure a product consisting of avidin and inert matter in said ratio.

3. A method of preparing anti-biotin material, said method comprising the steps of spreading frog oviduct tissue in fresh state in a relatively thin layer, drying said tissue by exposing said layer to a current of air having a temperature not over about 37° C. to obtain dried tissue having a ratio of substantially 0.75 unit of active avidin to each gram of inert tissue matter, and finely dividing said dried tissue to secure a product consisting of avidin and inert matter in said ratio.

ROY HERTZ.
WILLIAM H. SEBRELL.